(12) United States Patent
Varga et al.

(10) Patent No.: US 8,307,104 B2
(45) Date of Patent: Nov. 6, 2012

(54) SUBMIT REPORT HANDLING IN SMSIP

(75) Inventors: Jozsef Varga, Nagydobsza (HU); Gyorgy Tamas Wolfner, Budapest (HU)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/524,533

(22) PCT Filed: Jan. 28, 2008

(86) PCT No.: PCT/IB2008/000181
§ 371 (c)(1),
(2), (4) Date: Dec. 9, 2009

(87) PCT Pub. No.: WO2008/093199
PCT Pub. Date: Aug. 7, 2008

(65) Prior Publication Data
US 2010/0115111 A1  May 6, 2010

Related U.S. Application Data

(60) Provisional application No. 60/897,819, filed on Jan. 29, 2007.

(51) Int. Cl.
*G06F 15/16* (2006.01)
(52) U.S. Cl. ........................................ 709/230
(58) Field of Classification Search ........... 709/227, 709/228
See application file for complete search history.

(56) References Cited

U.S. PATENT DOCUMENTS

| | | | | |
|---|---|---|---|---|
| 7,715,856 | B2 * | 5/2010 | Shaheen | 455/466 |
| 2003/0043992 | A1 * | 3/2003 | Wengrovitz | 379/229 |
| 2004/0230697 | A1 * | 11/2004 | Kiss et al. | 709/245 |
| 2005/0282565 | A1 * | 12/2005 | Shaheen | 455/466 |
| 2006/0004924 | A1 * | 1/2006 | Trossen | 709/228 |
| 2006/0095522 | A1 * | 5/2006 | Rang et al. | 709/206 |
| 2007/0123277 | A1 * | 5/2007 | Harris et al. | 455/466 |

(Continued)

FOREIGN PATENT DOCUMENTS

WO  WO-2005025180 A1  3/2005

(Continued)

OTHER PUBLICATIONS

Office Action from corresponding Russian Application No. 2009132357, dated Jul. 8, 2010, 5 pages.

(Continued)

*Primary Examiner* — Jason Recek
(74) *Attorney, Agent, or Firm* — Mintz, Levin, Cohn, Ferris, Glovsky & Popeo, P.C.

(57) ABSTRACT

Submit report handling in Short Message Session Initiation Protocol (SMSIP) is provided. For example, a method can include preparing a submit report, wherein the preparing includes using a combination of forking and an in-reply-to header to find an appropriate terminal. The method can also include sending the submit report to the appropriate terminal. Likewise, another method can include receiving, by an apparatus, a session initiation protocol message request including a submit report. The method can also include processing the submit report to determine whether the request corresponds to a message sent by the apparatus. The method can further include sending, when the submit report is determined not to correspond to any message sent by the apparatus, a not-acceptable-here session initiation protocol response. The method can additionally include sending, when the submit report is determined to correspond to the message sent by the apparatus, an ok session initiation protocol message.

14 Claims, 3 Drawing Sheets

U.S. PATENT DOCUMENTS

2007/0298817 A1* 12/2007 Alfano et al. ............... 455/466

FOREIGN PATENT DOCUMENTS

WO 20050036902 A 4/2005
WO 20050122604 A 12/2005

OTHER PUBLICATIONS

3GPP: "Support of SMS over IP Networks; Stage 3 (Release 7)", 3GPP TS 24.341 V1.0.0, Nov. 2006, XP002496274, 3GPP, section 3-5, Annex A.5.

"Session Initiation Protocol (SIP) Extension for Instant Messaging; rfc3428.txt" IETF Standard, Internet Engineering Task Force, IETF, CH Dec. 1, 2002, XP015009171, ISSN: 0000-0003.

3GPP: "3GPP TS 23.204 v7.1.0 (Dec. 2006)—3rd Generation Partnership Project; Technical Specification Group Services and System Aspects; Support of Short Message Service (SMS)—over generic 3GPP Internet Protocol (IP) access; Stage 2—(Release 7)", Dec. 1, 2006, 3RD Generation Partnership Project (3GPP); Technical Specification (TS), XX, XX, pp. 1-16, XP007902548.

Rosenberg J et al: "SIP: Session Initiation Protocol" 20020601; 20020600, Jun. 1, 2002, pp. 1-269, XP015009039.

Nokia: "Terminating SMS over IP"; C1-062059, Oct. 30, 2006, Nov. 3, 2006 XP002496023; 3GPP TSG CT WG#44.

Huawei: "The issue of the SMS submit report"; S2-070194, Jan. 15-19, 2007 XP002496198; 3GPP TSG SA WG2 Architecture S2#56.

Nokia: "Forking Issues"; C1-070336, Feb. 5-9, 2007 XP002496199; 3GPP TSG CT WG1 Meeting #45.

"International Search Report and the Written Opinion of the International Searching Authority", received in corresponding PCT Application No. PCT/IB2008/000181, Dated Dec. 3, 2008, 6 pages.

3GPP TS 24.229, v5.18.0, 3rd Generation Partnership Project; Technical Specification Group Core Network and Terminals; IP Multimedia Call Control Protocol based on Session Initiation Protocol (SIP) and Session Description Protocol (SDP); Stage 3 (Release 5), Sep. 2006.

3GPP TS 23.040, V6.8.1, 3rd Generation Partnership Project; Technical Specification Group Core Network and Terminals; Technical realization of the Short Message Service (SMS) (Release 6), Oct. 2006.

3GPP TS 24.011, V6.0.0, 3rd Generation Partnership Project; Technical Specification Group Core Network; Point-toPoint (PP) Short Message Service (SMS) support on mobile radio interface (Release 6), Sep. 2003.

IETF RFC 3841, Caller Preferences for the Session Initiation Protocol (SIP), IETF, Aug. 2004, pp. 1-26.

* cited by examiner

US 8,307,104 B2

SUBMIT REPORT HANDLING IN SMSIP

RELATED APPLICATION

This application was originally filed as PCT Application No. PCT/IB2008/000181 filed Jan. 28, 2008, which claims priority to U.S. Provisional Application No. 60/897,819 filed Jan. 29, 2007.

BACKGROUND OF THE INVENTION

1. Field of the Invention

The present invention generally relates to telecommunications. For example, the present invention can relate to Internet Protocol (IP) networks. In certain embodiments, the present invention specifically relates to Short Message Service (SMS) signaling over IP networks and SMS termination in an IP Multimedia Subsystem (IMS), as well as SMS more generally.

2. Description of the Related Art

In conventional SMS termination in IP Multimedia Subsystem (IMS) applications, Session Initiation Protocol (SIP) is used for initiating and controlling service requests. The conventional art does not provide a way to ensure that a submit report is targeted to the terminal that is submitting the short message.

SUMMARY OF THE INVENTION

One embodiment of the present invention is a method. The method includes preparing a submit report, wherein preparing the submit report includes using a combination of forking and an in-reply-to header to find an appropriate device. The method also includes sending the submit report to the appropriate device.

Another embodiment of the present invention is also a method. The method includes receiving, by an apparatus, a session initiation protocol message request including a submit report. The method also includes processing the submit report to determine whether the request corresponds to a message sent by the apparatus. The method further includes sending, when the submit report is determined not to correspond to any message sent by the apparatus, a not-acceptable-here session initiation protocol response, and sending, when the submit report is determined to correspond to the message sent by the apparatus, an ok session initiation protocol message.

Another embodiment of the present invention is an apparatus. The apparatus includes processing means for preparing a submit report, wherein preparing the submit report includes using a combination of forking and an in-reply-to header to find an appropriate device. The apparatus further includes transmitting means for sending the submit report to the appropriate device.

A further embodiment of the present invention is also an apparatus. The apparatus includes receiving means for receiving a session initiation protocol message request including a submit report. The apparatus also includes processing means for processing the submit report to determine whether the request corresponds to a message sent by the apparatus. The apparatus further includes transmitting means for sending, when the submit report is determined not to correspond to any message sent by the apparatus, a not-acceptable-here session initiation protocol response, and for sending, when the submit report is determined to correspond to the message sent by the apparatus, an ok session initiation protocol message.

A further embodiment of the present invention is another apparatus. The apparatus includes a processor configured to prepare a submit report, wherein preparing the submit report includes using a combination of forking and an in-reply-to header to find an appropriate device. The apparatus also includes a transmitter configured to send the submit report to the appropriate device.

An additional embodiment of the present invention is also an apparatus. The apparatus includes a receiver configured to receive a session initiation protocol message request including a submit report. The apparatus further includes a processor configured to process the submit report to determine whether the request corresponds to a message sent by the apparatus. The apparatus also includes a transmitter configured to send, when the submit report is determined not to correspond to any message sent by the apparatus, a not-acceptable-here session initiation protocol response, and to send, when the submit report is determined to correspond to the message sent by the apparatus, an ok session initiation protocol message.

Another embodiment of the present invention is a computer program embodied on a computer-readable medium, and encoding instructions for performing a method when executed in hardware. The method includes preparing a submit report, wherein preparing the submit report includes using a combination of forking and an in-reply-to header to find an appropriate device. The method also includes sending the submit report to the appropriate device.

A further embodiment of the present invention is also a computer program embodied on a computer-readable medium, and encoding instructions for performing a method when executed in hardware. The method includes receiving, by an apparatus, a session initiation protocol message request including a submit report. The method also includes processing the submit report to determine whether the request corresponds to a message sent by the apparatus. The method further includes sending, when the submit report is determined not to correspond to any message sent by the apparatus, a not-acceptable-here session initiation protocol response, and sending, when the submit report is determined to correspond to the message sent by the apparatus, an ok session initiation protocol message.

DESCRIPTION OF THE PREFERRED EMBODIMENTS

Figure 1:
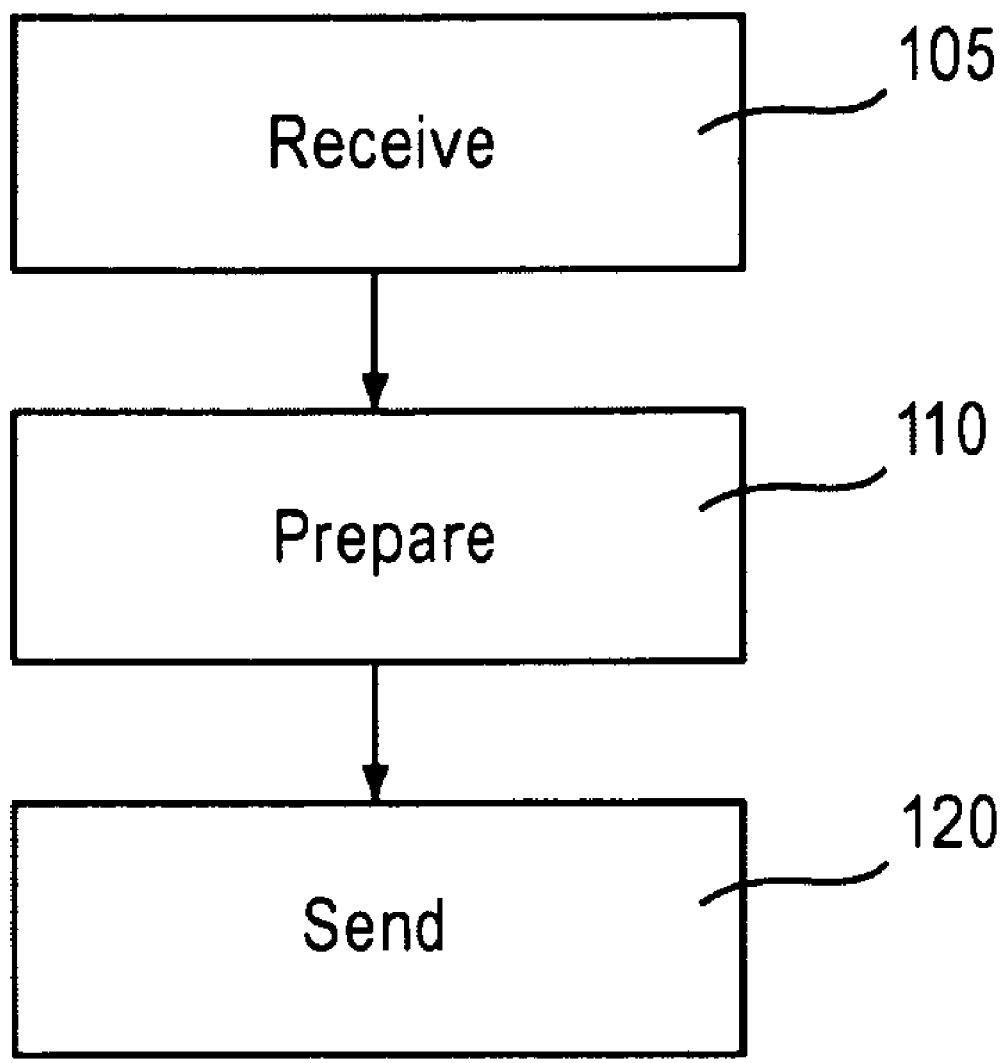
FIG. 1 depicts an example of a method in accordance with some exemplary embodiments.

Communication can occur in wireless communication networks and systems, such as Third Generation Parternship Project (3GPP), wherein SMS messages are sent from one user terminal to another user terminal. SMS messages, or short message service messages, are typically sent over networks operating on a communication protocols such as Internet Protocol (IP). The SMS can be terminated in the IP multimedia subsystems (IMS), and utilizes Session Initiation Protocol (SIP) for initiating and controlling service request. The specifications of such SIP protocol details can be found, for example, in 3GPP Technical Specification (TS) 24.229. The contents of this technical specification are hereby incorporated by reference.

The functionality of SMS over IP is defined in 3GPP TS 23.204 and 24.341. The contents of these documents are hereby incorporated by reference in their respective entireties. General SMS functionality is described, for example, in 3GPP TS 23.040 and TS 24.011, which are also hereby incorporated by reference in their respective entireties.

In one example, two pieces of user equipment can share one IMS Public User Identity (IMPU), with all having SMSIP capability. When the user equipments (UEs) are registered to the IMS network, one user equipment may identify its priority as being higher than the other user equipment in the registration procedure. When one of these two user equipments sends an SMS message to a third piece of user equipment, it is possible for the Short Message Service Center (SM-SC) to send a submit report to the sender. However, if sequential forking is being used, it is possible that the submit report may not properly directed to the sender. The other piece of user equipment may erroneously receive a submit report in a case parallel forking is being used.

Likewise, whenever a short message is submitted from a terminal having a shared mobile subscriber integrated services digital network number (MSISDN), the submit report termination can (conventionally) be ambiguous. Thus, conventionally, it can happen that a submit report goes to a terminal other than the one that submitted the short message.

According to certain embodiments of the present invention, whenever a SIP MESSAGE request encapsulating SMS-submit-report is sent, the Internet Protocol-Short Message-Gateway (IP-SM-GW) can insert a Request-Disposition header indicating either parallel or sequential forking, and can insert an In-Reply-To header with the call-identification (ID) or Reply-To header of the SIP MESSAGE request that encapsulated the submitted short message. The Serving-Call Session Control Function (S-CSCF) can send the SIP MESSAGE request, including the submit report, toward the possible contacts, either to all contacts at once or sequentially. Any wrong attempts, such wrong attempts being attempts to direct the submit report towards a user equipment that is not submitting the short message, are rejected with, for example, a "486 not acceptable here" response. A correct attempt will result in a "200 OK" response.

The present invention can solve the targeting problem in that when the user equipment submitting a short message does not receive the submit report, the submit report is resent. Additionally, there is no need for a new SIP extension, since a unique user ID can not be a Globally Routable User Agent (UA) Uniform Resource Identifier (URI) (GRUU) for SIP MESSAGE request.

The present invention, therefore, can use a combination of forking, that is a Request-Disposition header inserted with a "fork" attribute, and an In-Reply-To header, as a mechanism to find the user equipment that submitted the short message. This can prevent the problem of the conventional art wherein a submit report can be sent to a terminal other than the terminal that submitted the short message.

In one embodiment, the invention can include a system for communicating SMS messages, the system having a first unit that sends a short message to a destination. The system can also include a second unit that inserts a header into the message, with a header including identification information regarding the sender.

Upon receipt of the message by the destination, the destination can send a response message to the sender. The response message can be targeted for receipt by the sender.

Certain embodiments of the present invention can also include a network element having a receiving unit for receiving an SMS message from a sender. The element can have a header insertion unit for inserting a header into the message, with the header including specific identification information regarding the sender. A forwarding unit can forward the message to the destination. The network element is also configured to receive a response message from the destination, and to forward the response message to the sender.

A method according to an embodiment of the invention can include sending a message from a sender to a destination, and inserting a header into the message at a Gateway. The message can then include forwarding the message to the destination, sending a response message from the destination to the sender, and receiving the response message at the sender.

FIG. 1 illustrates a first method according to an embodiment of the present invention. As illustrated in FIG. 1, the method includes preparing 110 a submit report. Preparing 110 the submit report includes using a combination of forking and an in-reply-to header to find an appropriate terminal. The method also includes sending 120 the submit report to the appropriate terminal.

The sending 120 the submit report to the appropriate terminal can include avoiding ambiguity that would otherwise result in the submit report being terminated on a terminal other than the appropriate terminal. The appropriate terminal can have a shared mobile subscriber integrated services digital network number. The appropriate terminal can be a user equipment, personal digital assistant, portable communication device, wireless terminal, wireless handheld device, personal computer, or a mobile station.

The forking can include inserting a fork attribute in a request-disposition header. The preparing 110 the submit report can be triggered by receiving 105 a short message request submitted from the appropriate terminal.

Figure 2:
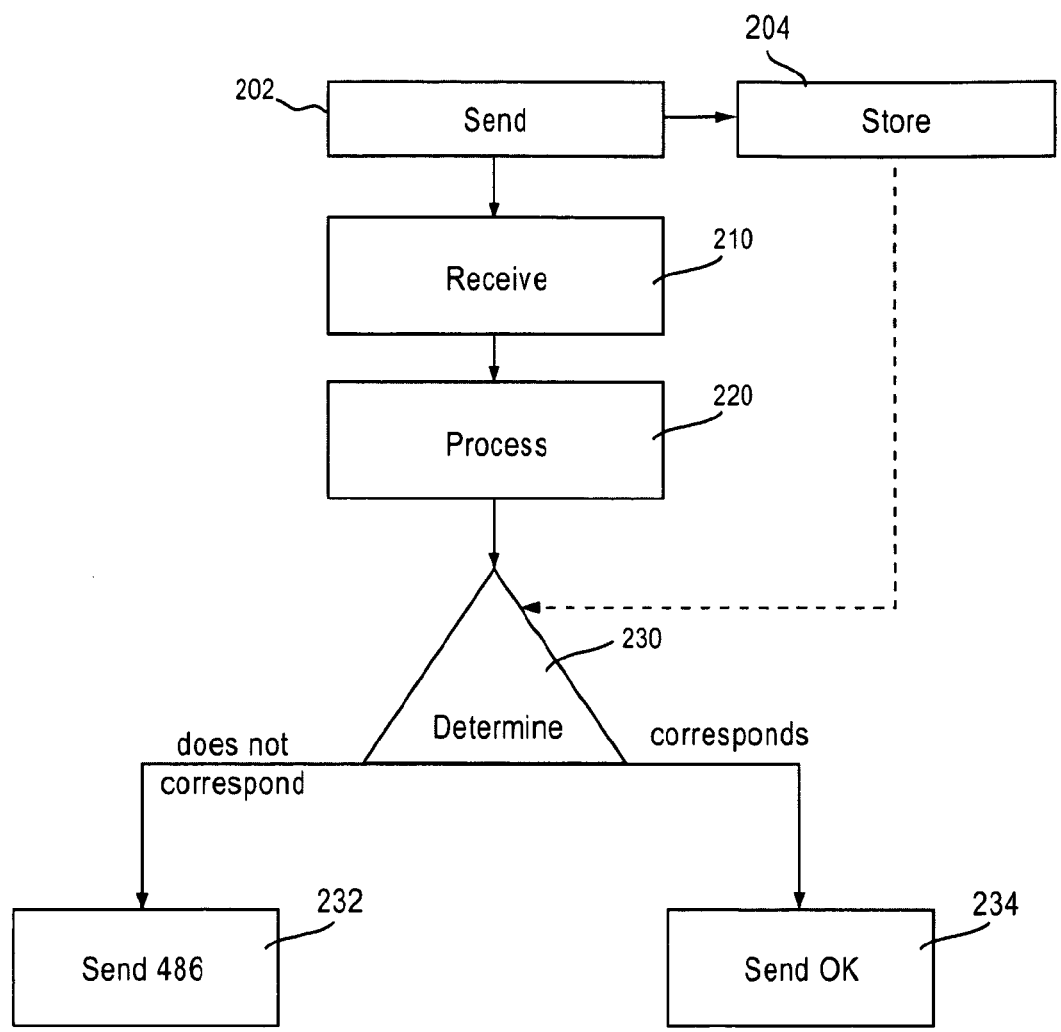
FIG. 2 depicts another example of a method in accordance with some exemplary embodiments.

FIG. 2 illustrates another method according to an embodiment of the present invention. As depicted in FIG. 2, the method can include receiving 210, by an apparatus, a session initiation protocol message request including a submit report. The method can also include processing 220 the submit report to determine whether the request corresponds to a message sent by the apparatus. The method can further include sending 232, when the submit report is determined not to correspond to any message sent by the apparatus, a not-acceptable-here session initiation protocol response. The method can additionally include sending 234, when the submit report is determined to correspond to the message sent by the apparatus, an ok session initiation protocol message.

The apparatus can be a user equipment, personal digital assistant, portable communication device, wireless terminal, wireless handheld device, personal computer, or a mobile station. The submit report can be received from and the not-acceptable-here or ok session initiation protocol message can be sent to an internet protocol short message gateway.

The method shown in FIG. 2 can also include, before the receiving 210 the submit report, sending 202 the corresponding message as a session initiation protocol message request, and storing 204 the call identification of the corresponding message.

Additionally, the method of FIG. 2 can include determining 230 that (or whether) the submit report corresponds to the corresponding message by comparing a received call identification in the submit report with the call identification previously stored.

The methods illustrated in FIGS. 1 and 2 can be implemented in hardware, software, or a combination thereof. For example, a computer program can be embodied on a computer-readable medium, and can encode instructions for performing the methods of FIG. 1 and/or FIG. 2 when executed in hardware.

Figure 3:
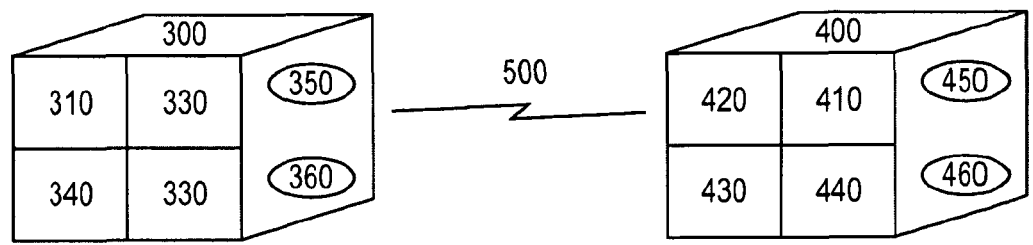
FIG. 3 depicts an example of a system in accordance with some exemplary embodiments.

FIG. 3 illustrates a system according to an embodiment of the present invention. The system includes a first apparatus 300 (which can be an internet protocol short message gateway) and a second apparatus 400. The first apparatus 300 and the second apparatus 400 can include respective receivers 310, 410, processors 320, 420, transmitters 330, 430, and memories 340, 440. The first apparatus 300 and the second apparatus 400 can be configured to provide various functions, as will be discussed below. From another perspective, the first apparatus 300 and the second apparatus 400 can provide various functional configurations using hardware 350, 450, software 360, 360 or a hybrid thereof.

The first apparatus 300 and the second apparatus 400 can be connected over a communication link 500, which may be a wireless link, a wireline link, or a combination of wireless and wireline. Intermediate elements that may relay signaling between the first apparatus 300 and the second apparatus 400 are omitted for ease of illustration.

The first apparatus 300 and the second apparatus 400, for hardware 350, 450 can be provided with a general purpose computer, Application Specific Integrated Circuit (ASIC) or similar equipment, which can, in certain embodiments, be used as the processor 320, 420. Likewise, the first apparatus 300 and the second apparatus 400, can be equipped with network communication equipment for communicating in a network, such as an Internet Protocol (IP) network and/or a 3GPP network. Other communication equipment, such as antennas, can be included. Furthermore, the first apparatus 300 and the second apparatus 400 can have, for their memory 340, 440, a hard drive, flash Random Access Memory (RAM), a Electronically Programmable Read Only Memory (EPROM), a removable disk memory, or the like.

Thus, the first apparatus 300 can be configured to prepare a submit report, wherein preparing the submit report includes using a combination of forking and an in-reply-to header to find an appropriate terminal (such as second apparatus 400). The first apparatus 300 can also be configured to send the submit report to the appropriate terminal.

The sending the submit report to the appropriate terminal can include avoiding ambiguity that would otherwise result in the submit report being terminated on a terminal other than the appropriate terminal. The forking can include inserting a fork attribute in a request-disposition header.

The appropriate terminal can have a shared mobile subscriber integrated services digital network number, and can be a user equipment, personal digital assistant, portable communication device, wireless terminal, wireless handheld device, personal computer, or a mobile station.

The first apparatus 300 can additionally be configured to receive a short message request submitted from the appropriate terminal, and to trigger the preparation of the submit report upon receipt of the short message request.

The second apparatus 400 can be configured to receive a session initiation protocol message request comprising a submit report. The second apparatus 400 can also be configured to process the submit report to determine whether the request corresponds to a message sent by the apparatus. The second apparatus 400 can further be configured to send, when the submit report is determined not to correspond to any message sent by the apparatus, a not-acceptable-here session initiation protocol response, and to send, when the submit report is determined to correspond to the message sent by the apparatus, an ok session initiation protocol message.

The second apparatus 400 can be a user equipment, personal digital assistant, portable communication device, wireless terminal, wireless handheld device, personal computer, or a mobile station.

The submit report can be received from and the not-acceptable-here or ok session initiation protocol message can be sent to the first apparatus 300, which can be an internet protocol short message gateway.

The second apparatus 400 can be configured to, before receiving the submit report, send the corresponding message as a session initiation protocol message request, and to store the call identification of the corresponding message.

Furthermore, the second apparatus 400 can be configured to determine that the submit report corresponds to the corresponding message by comparing a received call identification in the submit report with the call identification previously stored.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method, comprising:
preparing a short message service submit report, wherein the short message service submit report includes an indication of forking and an in-reply-to header to find a device; and
sending the short message service submit report to the device,
wherein the preparing the short message service submit report is triggered by receiving a short message service request submitted by the device,
wherein the indication of forking comprises a fork attribute inserted into a request-disposition header.

2. The method of claim 1, wherein the device comprises a shared mobile subscriber integrated services digital network number.

3. The method of claim 1, wherein the device comprises at least one of a user equipment, a personal digital assistant, a portable communication device, a wireless device, a wireless handheld device, a personal computer, and a mobile station.

4. The method of claim 1, wherein the indication of forking includes an indication of parallel forking or sequential forking.

5. The method of claim 1, wherein the in-reply-to header comprises one or more of a session initiation protocol message request encapsulating a short message service message and a call identification.

6. An apparatus, comprising:
a receiver configured to receive a short message request submitted from a device, wherein a processor is triggered to prepare a short message service submit report, when the short message request is received, wherein the short message service submit report includes an indication of forking and an in-reply-to header to find the device; and
a transmitter configured to send the short message service submit report to the device,
wherein the indication of forking comprises a fork attribute inserted into a request-disposition header.

7. The apparatus of claim 6, wherein the device comprises a shared mobile subscriber integrated services digital network number.

8. The apparatus of claim 6, wherein the device comprises at least one of a user equipment, a personal digital assistant, a portable communication device, a wireless terminal, a wireless handheld device, a personal computer, and a mobile station.

9. The apparatus of claim 6, wherein the apparatus is an internet protocol short message gateway.

10. The apparatus of claim 6, wherein the indication of forking includes an indication of parallel forking or sequential forking.

11. The apparatus of claim 6, wherein the in-reply-to header comprises one or more of a session initiation protocol message request encapsulating a short message service message and a call identification.

12. A non-transitory computer program embodied on a computer-readable medium including instructions which when executed by at least one processor provides operations comprising:

preparing a short message service submit report, wherein the short message service submit report includes an indication of forking and an in-reply-to header to find a device; and sending the short message service submit report to the device, wherein the preparing the short message service submit report is triggered by receiving a short message request submitted from the device, wherein the indication of forking comprises a fork attribute inserted into a request-disposition header.

13. The non-transitory computer program embodied on a computer-readable medium of claim 12, wherein the device comprises a shared mobile subscriber integrated services digital network number.

14. The non-transitory computer program embodied on a computer-readable medium of claim 12, wherein the device comprises at least one of a user equipment, a personal digital assistant, a portable communication device, a wireless device, a wireless handheld device, a personal computer, and a mobile station.

* * * * *